US010295223B2

(12) United States Patent
Launay

(10) Patent No.: US 10,295,223 B2
(45) Date of Patent: May 21, 2019

(54) DEVICE AND SYSTEM FOR QUANTIFYING THE USEFUL THERMAL ENERGY AVAILABLE IN A TANK

(71) Applicants: CENTRE NATIONAL DE LA RECHERCHE SCIENTIFIQUE, Paris (FR); UNIVERSITE D'AIX MARSEILLE, Marseilles (FR)

(72) Inventor: Stephane Launay, Greasque (FR)

(73) Assignees: CENTRE NATIONAL DE LA RECHERCHE SCIENTIFIQUE, Paris (FR); AIX-MARSEILLE UNIVERSITE, Marseilles (FR)

(*) Notice: Subject to any disclaimer, the term of this patent is extended or adjusted under 35 U.S.C. 154(b) by 200 days.

(21) Appl. No.: 15/302,880

(22) PCT Filed: Apr. 9, 2015

(86) PCT No.: PCT/FR2015/050936
§ 371 (c)(1),
(2) Date: Oct. 7, 2016

(87) PCT Pub. No.: WO2015/155483
PCT Pub. Date: Oct. 15, 2015

(65) Prior Publication Data
US 2017/0038093 A1 Feb. 9, 2017

(30) Foreign Application Priority Data
Apr. 10, 2014 (FR) ..................... 14 53205

(51) Int. Cl.
*G01K 3/00* (2006.01)
*F24H 9/20* (2006.01)
(Continued)

(52) U.S. Cl.
CPC .......... *F24H 9/2021* (2013.01); *G01K 1/026* (2013.01); *G01K 3/00* (2013.01); *G01K 5/62* (2013.01);
(Continued)

(58) Field of Classification Search
CPC ................. G01F 23/243; G01K 3/14
See application file for complete search history.

(56) References Cited

U.S. PATENT DOCUMENTS 6,990,861 B2 * 1/2006 Ham ..................... F24H 9/2035
73/295
7,004,625 B2 * 2/2006 Egidio .................. G01K 1/026
374/112

(Continued)

FOREIGN PATENT DOCUMENTS

EP    2 017 587 A1    1/2009
FR    2 851 644 A1    8/2004

(Continued)

OTHER PUBLICATIONS

International Search Report dated Jul. 27, 2015 in PCT/FR2015/050936 filed Apr. 9, 2015.

(Continued)

*Primary Examiner* — Clayton E. LaBalle
*Assistant Examiner* — Leon W Rhodes, Jr.
(74) *Attorney, Agent, or Firm* — Oblon, McClelland, Maier & Neustadt, L.L.P.

(57) ABSTRACT

A device for quantifying a useful thermal energy available in a tank for storing a heated or cooled fluid or solid includes: a plurality of thermoelectric converters configured to be distributed in plural locations of the storage tank; an electric circuit interconnecting the thermoelectric converters; a device measuring a single electrical variable of the electric circuit; and a converter converting a single measurement of the single electrical variable into a value for quantification of the useful thermal energy available in the storage tank.

18 Claims, 6 Drawing Sheets

(51) Int. Cl.
*G01K 1/02* (2006.01)
*G01K 5/62* (2006.01)
*G01K 7/22* (2006.01)
*G01K 11/06* (2006.01)
*G01K 7/16* (2006.01)

(52) U.S. Cl.
CPC ................ *G01K 7/16* (2013.01); *G01K 7/22* (2013.01); *G01K 11/06* (2013.01); *F24D 2220/042* (2013.01)

(56) References Cited

U.S. PATENT DOCUMENTS

| | | | |
|---|---|---|---|
| 7,996,182 B2 * | 8/2011 | Hotton | G03G 15/556 122/14.1 |
| 9,772,210 B1 * | 9/2017 | Houghton | G01F 23/22 |
| 2011/0211612 A1 * | 9/2011 | Branecky | F24D 19/1006 374/115 |
| 2014/0321839 A1 | 10/2014 | Armstrong | |
| 2015/0323391 A1 * | 11/2015 | McCulloch | F24H 9/2007 374/185 |

FOREIGN PATENT DOCUMENTS

| | | |
|---|---|---|
| FR | 2 891 352 A1 | 3/2007 |
| WO | 2011/103447 A1 | 8/2011 |
| WO | 2013/014411 A2 | 1/2013 |
| WO | WO 2014039003 A1 * | 3/2014 ............. G01K 13/10 |

OTHER PUBLICATIONS

French Search Report dated Nov. 27, 2014 in FR 1453205 filed Apr. 10, 2014.

* cited by examiner

DEVICE AND SYSTEM FOR QUANTIFYING THE USEFUL THERMAL ENERGY AVAILABLE IN A TANK

BACKGROUND

This invention relates to a device for quantifying a useful thermal energy available in a tank for storing a heated or cooled fluid or solid. It also relates to a system for quantifying useful thermal energy comprising such a device.

A tank for storing a heated fluid or solid is generally used in systems for generating, storing and restoring heat. Likewise, a tank for storing a cooled fluid or solid is generally used in systems for generating, storing and restoring cold.

More concretely, a simple and common example of application consists in using a storage tank of heated water in a system for generating and for consuming sanitary hot water or water for heating. In such a storage tank, hot and cold water cohabitate and tend to remain gradually separated into horizontal strata or isotherms in each one of which the water substantially has the same temperature. But from one stratum to the other, the temperature of the water differs, with the strata of hot water being arranged in the upper portion of the tank and the strata of cold water in the lower portion. More precisely, the higher one goes in the succession of strata inside the tank, the hotter the water is. This stratification phenomenon of the water in a hot water tank is well known to those skilled in the art. It is due to the effects of universal gravity on the density of water which is a decreasing function of temperature.

As such, during the heating, in the storage tank, of a fluid initially at a uniform temperature, the stratification of the fluid is established naturally.

Moreover, even when the water heated and stored in the tank is consumed, the stratification is preserved. Indeed, while hot water is generally taken in the upper portion of the tank, cold water enters via the lower portion of the tank in order to then be heated, in this way, the hottest stratum of water always remains at the top of the tank, while the incoming cold water constitutes the coldest stratum of water at the bottom of the tank. Between these two extreme strata are the strata of water being heated, of which the temperatures increase progressively, from the coldest stratum at the bottom to the hottest at the top.

In order to improve the performance of a system for generating and for consuming hot water, in particular in terms of saving energy, it is advantageous to be able to quantify at any time the useful heat available in the storage tank of such a system. This quantity of useful heat is defined a minima as being the quantity of water inside the tank of which the temperature is greater than or equal to a predetermined threshold temperature. The value of this threshold temperature represents the minimum value of the temperature that is required for the use, by a consumer, of the hot water restored by the system. In the case of a system for generating, storing and restoring sanitary hot water for example, this threshold temperature is generally 40° C.

The interest in quantifying the useful thermal energy available in the tank is in particular to be able to act on the regulation of the systems for generating and storing heat or cold, in particular when these systems use a renewable source of energy, for example solar, or when these systems use renewable sources of energy combined with fossil or nuclear sources. In this type of systems indeed, as the supply with energy by the renewable energy source varies substantially, a specific regulation for each situation is required in order to optimise the generating of heat or of cold by soliciting fossil sources as least as possible.

Moreover, currently, in order to be able to cover the needs of users during the periods of peak consumption and without being able to quantify the useful heat available at any time, the systems for producing sanitary hot water are oversized with respect to an average consumption of sanitary hot water evaluated. Of course, this prevents a possible discontent of users due to an occasional rupture in the availability of hot water, but at the price of an increase in the thermal losses of the systems and therefore a decrease in their efficiency or output. Being able to quantify the useful heat available in a tank makes it possible to inform the user on the quantity of hot water remaining in the tank, which allows the user to consequently react and to as such participate in a saving of energy through the knowledge at every instant of the quantity of hot water available. The need to oversize the system for producing the corresponding sanitary hot water is then avoided. In particular, when a value for the quantification of the useful heat indicates that the level of hot water available in the tank is under a predetermined threshold value, a switching to a less expensive economical consumption mode in terms of energy can be considered, in particular the reducing of the consumption of hot water by the user.

More generally, the interest of a device for quantifying useful thermal energy available concerns any industrial system, that has a tank for storing a heated or cooled fluid or solid, of which the performance can be improved thanks to good management of the storage of heat or of cold.

However, it can be difficult to measure the quantity of water contained in the storage tank of which the temperature is greater than or less than a desired threshold temperature. By way of example, in the case where there are two sensors independently measuring water temperatures at the bottom and at the top of the tank, if the two temperatures are substantially equal this implies that the contents of the tank is at a uniform temperature and therefore this temperature is known. On the other hand, if the two temperatures are far apart, it is impossible with only these two measurements to know where in the tank is the limit between the hot water and the cold water and consequently to estimate the quantity of useful heat or cold available in the storage tank.

Patent application published under number EP 2 017 587 A1 discloses a thermomechanical device for the quantification of hot water available in a storage tank and more particularly in a sanitary hot water tank. This device includes a capillary tube containing a heat transfer fluid arranged in or against the storage tank and extending over practically all of its height. The heat transfer fluid dilates under the action of the heat of the water in the storage tank and, in a first embodiment possible, mechanically engages the rotation of a needle by the intermediary of a Bourdon tube. This needle directly indicates the estimated quantity of hot water available in the tank according to the pressure that is exerted against the Bourdon tube. In a second possible embodiment, the dilatation of the heat transfer fluid mechanically engages the deformation of a membrane of an electronic pressure sensor. This sensor transcribes the deformation of the membrane into electrical data, in particular a variation in resistance, which can then be used by an electronic circuit in order to indicate an estimation of the quantity of hot water available.

This device has several disadvantages. Firstly, contrary to what it claims, it does not actually measure the quantity of hot water available in the tank, with the hot water having to be defined with respect to a threshold value as discussed previously. It rather measures the quantity of heat globally available in the tank, without being able to know what proportion of the water is actually "hot", i.e. what quantity of water has a temperature that exceeds the threshold value. Furthermore, this device is rather complex to set up. In the first embodiment, it requires a thermomechanical system with a capillary tube of heat transfer fluid associated with a Bourdon tube which itself drives a needle. In the second embodiment, it requires a thermomechanical system with a capillary tube of heat transfer fluid associated with an electromechanical system with an electronic pressure sensor, which involves the double conversion of a thermal variable into a mechanical variable then of this mechanical variable into an electrical variable.

A second solution consists in providing several thermoelectric converters distributed at several locations of the storage tank. By providing a sufficient number of thermoelectric converters, it is possible to reach a satisfactory quantification of the hot water present in the tank. By supposing for example that each thermoelectric converter concerns a predetermined volume of water at a constant temperature in the tank, it is easy to deduce from the measurements the quantity of water of which the temperature exceeds the threshold value. Another advantage of this second solution is that it is simple, thanks to a single conversion of a thermal variable into an electrical variable.

BRIEF SUMMARY

The invention more precisely relates to this second solution, concerning a device for quantifying the useful thermal energy available in a tank for storing a heated or cooled fluid or solid, including several thermoelectric converters intended to be distributed in several locations of the storage tank.

Examples of devices in accordance with this second solution are shown in patent applications published under numbers FR 2 851 644 A1 and FR 2 891 352 A1. Each one of these devices comprises several electrical temperature sensors placed at different heights of the tank. Several independent measurements of the temperature of the water in the tank are taken by these electrical temperature sensors. These documents do not describe how to deduce the quantity of hot water available in the tank, but for this, it would be necessary to analyse the plurality of independent electrical signals that result from these measurements. Furthermore, a sufficient number of electrical temperature sensors have to be provided in order to obtain a precise measurement, which renders even more complex the processing of the multiple electrical signals resulting from the measurements.

It can as such be desired to provide a device for quantifying useful thermal energy which makes it possible to overcome at least part of the aforementioned problems and constraints while still proposing a configuration in accordance with the second aforementioned solution.

A device for quantifying a useful thermal energy available in a tank for storing a heated or cooled fluid or solid is therefore proposed, comprising several thermoelectric converters intended to be distributed in several locations of the storage tank, including:
  an electric circuit interconnecting said thermoelectric converters,
  a device for measuring a single electrical variable of the electric circuit,
  means for converting this single electric variable into a value for the quantification of the useful thermal energy available in the storage tank.

As such, thanks to the invention, the device for quantifying useful thermal energy makes it possible to obtain simply from the measurement of a single electrical variable a value for the quantification of the useful thermal energy available in the storage tank, i.e., in the example of a system for supplying hot water, an estimation of the quantity of hot water available inside the tank of which the temperature is greater than a predetermined threshold temperature.

Optionally, each thermoelectric converter includes an electrical temperature sensor and at least one electrical resistance.

Also optionally, the electrical temperature sensor of each thermoelectric converter includes a thermoelectric switch that is sensitive in opening and in closing to a predetermined temperature threshold value, with this temperature threshold value being common to all of the thermoelectric converters. Such an implementation is particularly simple and inexpensive.

Also optionally, the thermoelectric switch of each thermoelectric converter is a bi-strip thermal breaker, a bimetal thermal breaker or a resettable fuse with a positive temperature coefficient.

Also optionally, the electrical temperature sensor of each thermoelectric converter further includes a thermistor arranged in parallel with the thermoelectric switch, at the terminals of the latter. Such an implementation makes it possible to more finely quantify the useful thermal energy available in the tank.

Also optionally, said at least one electrical resistance of each thermoelectric converter has a predetermined resistance value in such a way as to generate a value of the single electrical variable measured which is in a linear relationship with the value for the quantification of the useful thermal energy available in the storage tank. This configuration facilitates the conversion.

Also optionally, the electrical temperature sensors and the electrical resistances are arranged in the thermoelectric converters in such a way that:
  the electrical temperature sensors are arranged in series together e interconnection electrical circuit, and
  each electrical resistance connects an output terminal of the electrical temperature sensor of the thermoelectric converter to which it belongs to a first terminal, common to all of the electrical resistances, of the device for measuring.

Also optionally, the electrical temperature sensors and the electrical resistances are arranged in the thermoelectric converters in such a way that:
  each thermoelectric converter includes an electrical temperature sensor arranged in series with an electrical resistance, and
  the thermoelectric converters are arranged in parallel together in the interconnection electrical circuit.

Also optionally, the electrical temperature sensors and the electrical resistances are arranged in the thermoelectric converters in such a way that:
  the electrical resistances are arranged in series together in the interconnection electrical circuit, and
  each electrical temperature sensor connects a terminal of the electrical resistance of the thermoelectric converter to which it belongs to a first terminal, common to all of the electrical temperature sensors, of the device for measuring.

Also optionally, the single electrical variable measured is an intensity passing through the device for measuring or a voltage at the terminals of the device for measuring.

A system for the quantification of useful thermal energy is also proposed, comprising:
- a tank for storing a heated or cooled fluid or solid, and
- a device for quantifying useful thermal energy according to the invention, further provided with means of thermal and electrical insulation.

Optionally, the device for quantifying the useful thermal energy is placed in or against the storage tank substantially perpendicular to a plurality of isotherm strata of the heated or cooled fluid or solid.

Also optionally, a system for the quantification of useful thermal energy according to the invention can further include a device for indicating the quantification value of the useful thermal energy available in the storage tank, with this indicating device being connected by data transmission means the device for measuring and placed outside the storage tank in such a way as to facilitate the access of a user to this quantification value.

BRIEF DESCRIPTION OF THE DRAWINGS

The invention shall be better understood using the following description, given by way of example and made in reference to the annexed drawings wherein.

DETAILED DESCRIPTION

Figure 1:
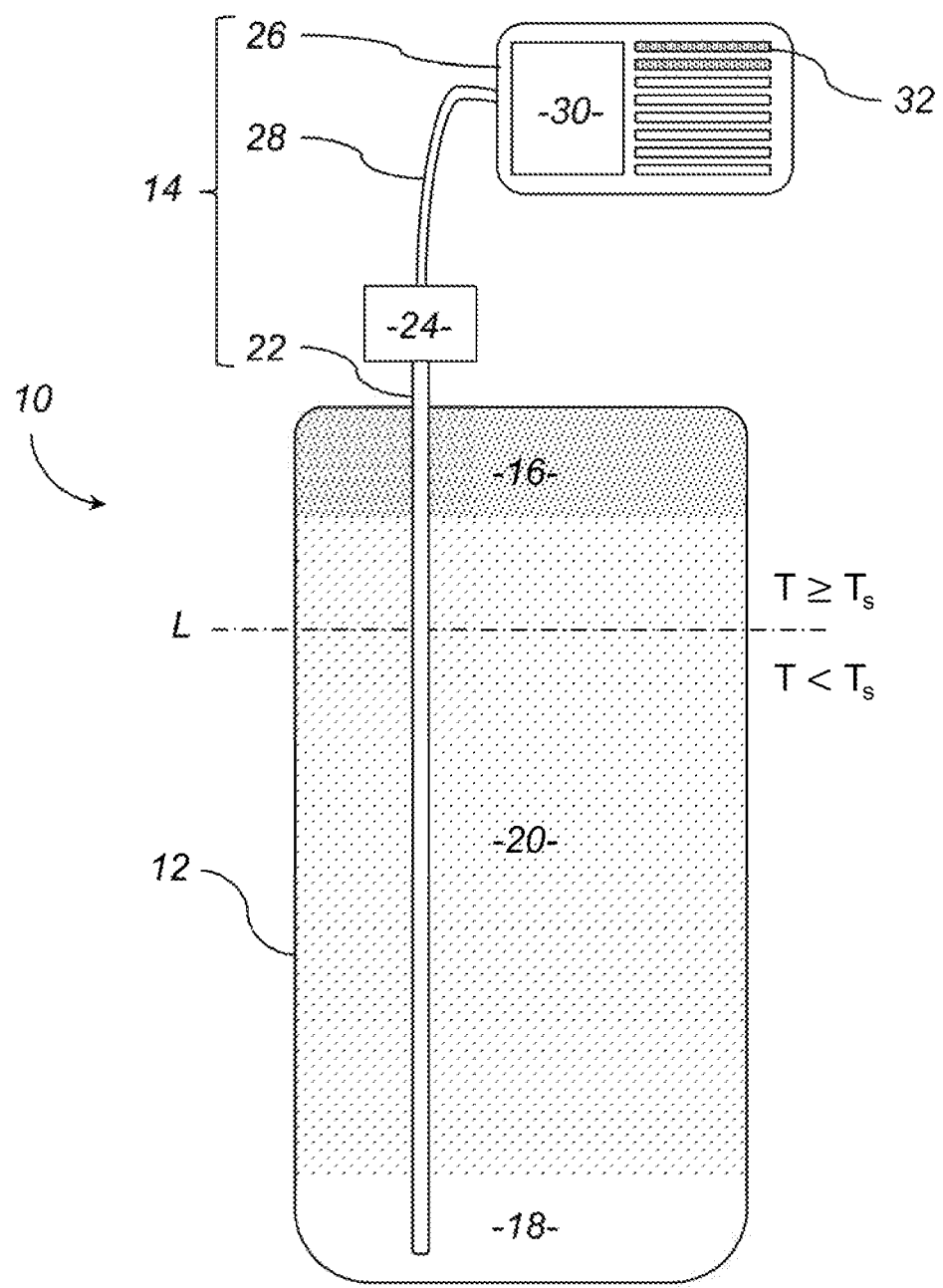
FIG. 1 diagrammatically shows the general structure of a system for the quantification of useful thermal energy for an installation for the generating, storing and restoring of heat, according to an embodiment of the invention, FIGS. 2 and 3 diagrammatically show the general structures of two possible embodiments of a device for quantifying useful thermal energy of the system of FIG. 1, FIG. 4 diagrammatically shows the detailed electrical structure of a possible alternative of the device of FIG. 2 or 3.

The system 10 for quantification of useful heat diagrammatically shown in FIG. 1 comprises a tank 12 for storing a heated fluid or solid and a device 14 for the quantification of the useful heat available in this tank 12. As indicated hereinabove, "quantity of useful heat" in the context of the invention means a minima the quantity of fluid or solid inside the tank 12 of which the temperature is greater than or equal to a predetermined threshold temperature noted as $T_s$. Such a system 10 is advantageously integrated into a conventional installation for the generating, storing and restoring of heat, of which the other comprising elements are not shown in FIG. 1.

The tank 12 contains, in this embodiment of the invention, a heated fluid, in particular water. This water is distributed into horizontal isothermal strata of which the temperatures increase progressively, from the coldest stratum at the bottom of the tank 12 to the hottest at the top. With a concern for simplification, for example eight horizontal strata are distinguished, considered to be isothermal, in the embodiment of FIG. 1. A first isothermal stratum of hot water 16 is arranged in the upper portion of the tank 12 and an eighth and last isothermal stratum of cold water 18 in the lower portion. Between these two isothermal strata 16 and 18 are in succession six isothermal strata 20 of water in the process of being heated. At any given instant, the principle of the invention is to determine which are the isothermal strata of which the temperature T is greater than or equal to $T_s$. These strata are located above a flat limit L to be determined in the tank 12, with the first isothermal stratum located above this limit L able to be called "thermocline".

The device 14 for quantifying useful heat includes an extended portion 22 extending in the tank 12 over practically all of its height substantially perpendicular to the isothermal strata 16, 18, 20. This extended portion 22 comprises several thermoelectric converters intended to be distributed at several locations of the tank 12 and interconnected by an electric circuit. The general structure of this extended portion 22, including the thermoelectric converters and the interconnection electric circuit, is not shown in FIG. 1 but shall be detailed in reference to FIGS. 2 and 3. In accordance with the simple example shown, eight thermoelectric converters can be provided in the extended portion 22, at a rate of one per isothermal stratum.

In an alternative embodiment not shown, the extended portion 22 can be placed against the outer wall of the tank 12. Such an alternative can be considered if the wall is thermally conductive and if the tank 12 is thermally insulated.

The device 14 for quantifying useful heat further includes a device 24 for measuring a single electrical variable of the electric circuit of the extended portion 22. This device for measuring 24 is placed at an end of the extended portion 22 that extends outside the tank 12, between two points of the electric circuit. This is for example a voltmeter or an ammeter able to measure a voltage or an intensity between these two points of the circuit.

The device 14 for quantifying useful heat further includes a device 26 for indicating a value for the quantification of the useful heat available in the tank 12. This indicating device 26 is placed outside the tank 12 in such a way as to facilitate the access of a user to this quantification value. It is connected to the device for measuring 24, for example electrically using a pair of electrical wires 28, in order to receive as input a value of the single electrical variable measured, i.e. a value of voltage or of intensity. The connection can also be established by any other electromagnetic means for transmitting data.

The indicating device 26 includes a module 30 for converting the single electrical variable measured into the value for the quantification of useful heat that it then indicates using a lighted display system 32. This module for converting 30 is for example comprised of a microprocessor associated with a conventional RAM memory and is designed to carry out a pre-programmed conversion operation of which the details will be provided in what follows. As shown in FIG. 1, the lighted display system 32 includes for example a vertical succession of horizontal lighted bars, with each lighted bar able to be constituted in particular of a plurality of light-emitting diodes not shown in FIG. 1. In this type of display, the number of lighted bars activated is proportional to the useful heat available in the tank 12, i.e. to the quantity of water available in the tank 12 of which the temperature is greater than or equal to the predetermined threshold temperature $T_s$. There are for example as many lighted bars as there are isothermal strata identified in the tank 12 and the number of lighted bars activated corresponds to the number of isothermal strata considered to be sufficiently hot, i.e. located above the limit L. By way of example, FIG. 1 shows the case where a quarter of all of the water in the tank 12 is at a temperature greater than the threshold temperature $T_s$.

Consequently a quarter of all of the lighted bars is activated (i.e. the two upper lighted bars that identify the two upper isothermal strata of the tank 12).

In other alternative embodiments, the display could have a digital form indicating, for example, the number of liters of hot water at a temperature greater than the threshold temperature $T_s$ available in the tank 12 or a percentage value indicating at what level the tank 12 is provided with hot water.

Figure 2:
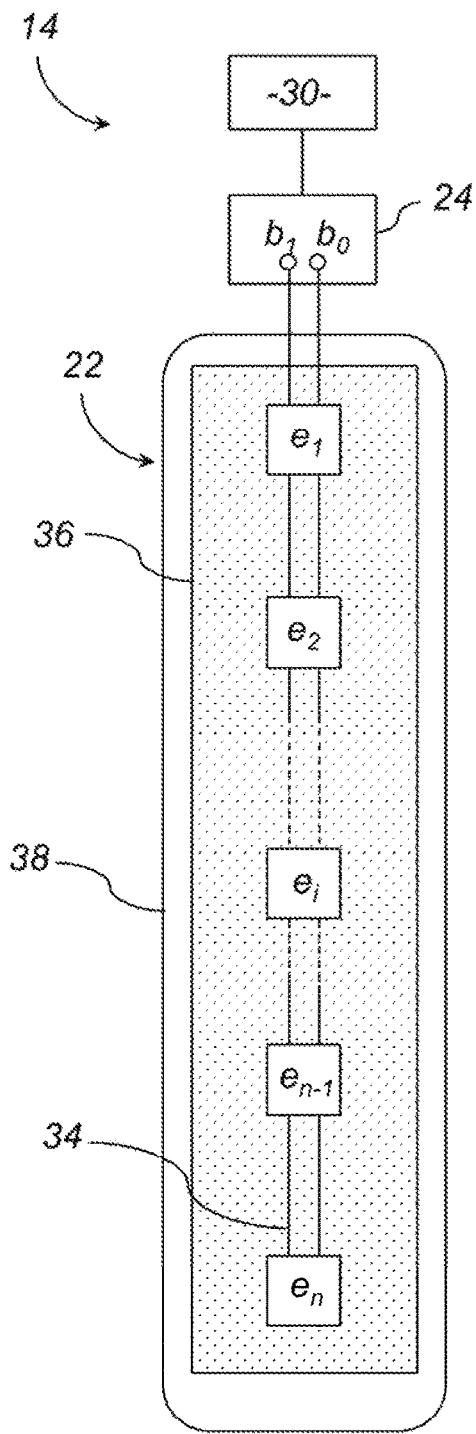

According to a first possible embodiment of the device 14 for quantifying useful heat, shown in FIG. 2, the latter comprises n thermoelectric converters $e_1, e_2, \ldots, e_i, \ldots, e_{n-1}, e_n$ interconnected by means of an electric circuit 34 in the extended portion 22. As indicated hereinabove, these thermoelectric converters $e_1, e_2, \ldots, e_i, \ldots, e_{n-1}, e_n$ are intended to be distributed at several locations along the tank 12, in particular at a rate of one per isothermal stratum which would give n=8 in the example shown in FIG. 1. The length of the extended portion 22 designed as such corresponds to the height of the zone of the tank 12 of which the value of quantification of the useful heat available will be deduced. The electric circuit 34 has two measuring points $b_0$ and $b_1$ at the and of the extended portion 22 on which the device for measuring 24 is arranged. The latter therefore reads a voltage or intensity value between its terminals that corresponds to the measuring points $b_0$ and $b_1$.

According to this first embodiment, the device 14 for quantifying useful heat further includes a single support 36, in the shape of a rectangular plate, that supports but also thermally and electrically insulates the thermoelectric converters $e_1, e_2, \ldots, e_i, \ldots, e_{n-1}, e_n$ between them. According to an alternative embodiment, this single support 36 can be comprised of a thin plate made of a semiconductor material, but in other alternative embodiments it could be carried out with other thermally and electrically insulating materials. The thermoelectric converts $e_1, e_2, \ldots, e_i, \ldots, e_{n-1}, e_n$ and the electric circuit 34 can be simply glued or, according to the manufacturing process, printed on the single support 36. They as such form a single module that cannot be divided.

According to this first embodiment also, the module that cannot be divided formed of the single support 36, thermoelectric converters $e_1, e_2, \ldots, e_i, \ldots, e_{n-1}, e_n$ and of the electric circuit 34, is integrated into a protective coating 38, which is also thermally and electrically insulating.

These means of thermal and electrical insulation that constitute the single support 36 and the protective coating 38 make it possible to avoid short-circuits but also and especially thermal transfers between the extended portion 22 of the quantification device 14 and the fluid contained in the tank 12. They therefore make it possible to prevent the appearance, by the vane effect, of vertical thermal conducting paths able to induce a transfer of heat from the hot strata of the tank 12 to the cold strata via the extended portion 22 of the device for quantification 14.

However, the protective coating 38 must be designed and arranged in such a way as to allow for horizontal thermal transfers between the fluid contained in the tank 12 and the thermoelectric converters $e_1, e_2, \ldots, e_i, \ldots, e_{n-1}, e_n$. Furthermore, it is necessary that the distribution time for these horizontal thermal transfers between the thermoelectric converters $e_1, e_2, \ldots, e_i, \ldots, e_{n-1}, e_n$ and the fluid be clearly less than the time relating to the change in the flat limit L between the zone of useful heat available in the tank 12 and the zone considered to be too cold.

Moreover, the protective coating 38 must be constituted of a material that can withstand the highest temperatures of the fluid in the tank 12.

An electrically insulating protective coating 38 made from a material of the polymer type is able to respond to all of these constraints. In the case where the tank 12 contains sanitary hot water, a polymer such as polytetrafluoroethylene (PTFE) is recommended. Other polymers such as polyethylene or rubber can be used in the case where the fluid contained in the tank 12 is provided for different non-sanitary uses.

Figure 3:
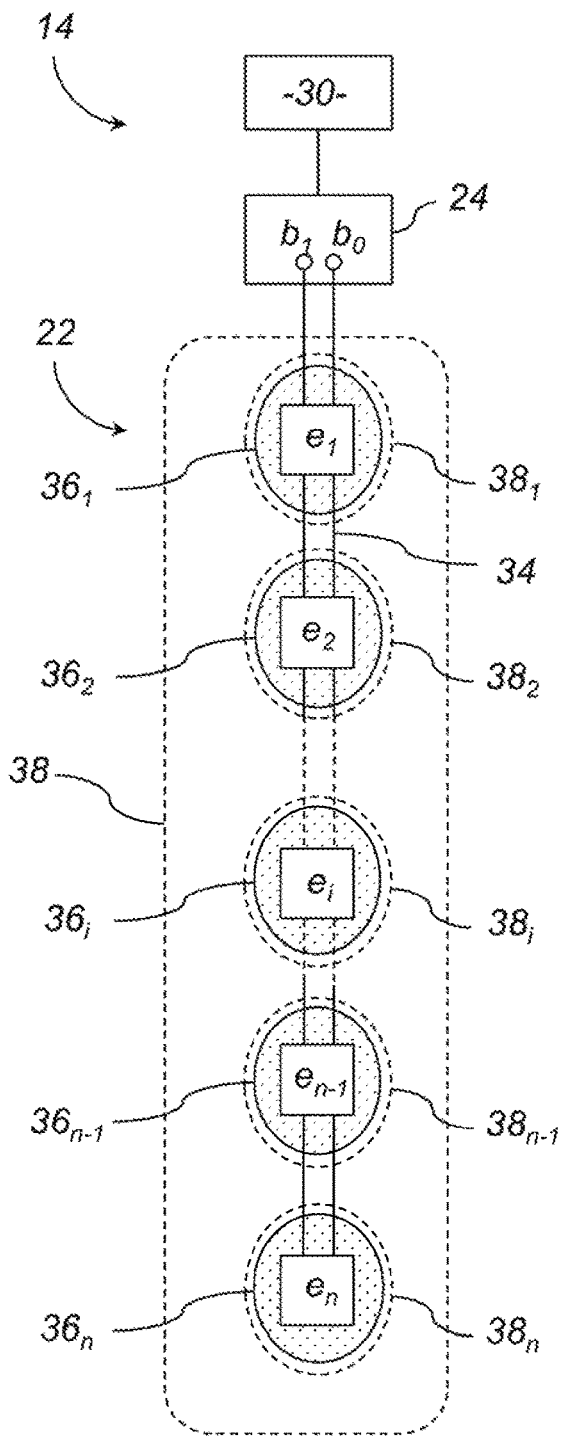

A second possible embodiment of the device 14 for quantifying useful heat is shown in FIG. 3. This embodiment differs from the preceding one in that the single support 36 is replaced with n independent supports $36_1, 36_2, \ldots, 36_i, \ldots, 36_{n-1}, 36_n$ whereon the n thermoelectric converters $e_1, e_2, \ldots, e_i, \ldots, e_{n-1}, e_n$ are respectively mounted.

As in the first embodiment described hereinabove, each one of the independent supports $36_1, 36_2, \ldots, 36_i, \ldots, 36_{n-1}, 36_n$ can be constituted of a thin plate made of semiconductor material, but in other alternative embodiments it can be comprised of other thermally and electrically insulating materials In the example shown in FIG. 3, the n independent supports $36_1, 36_2, \ldots, 36_i, \ldots, 36_{n-1}, 36_n$ are of oval shape, but in other alternative embodiments they can adopt various shapes.

According to the manufacturing process, each thermoelectric converter $e_1, e_2, \ldots, e_i, \ldots, e_{n-1}, e_n$ can be printed or simply glued onto its corresponding independent support $36_1, 36_2, \ldots, 36_i, \ldots 36_{n-1}, 36_n$.

The originality of this second embodiment of the device for quantification 14 is due to the fact that a unit comprising a thermoelectric converter, for example $e_i$, and its corresponding independent support, $36_i$, constitutes an independent module.

These n independent modules are then connected together by the electric circuit 34, for example using two connector wires such as shown in FIG. 3.

According to a first alternative of this second embodiment of the device for quantification 12, the independent modules connected together by the electric circuit 34 can then be arranged in the protective coating 38 in a way substantially equivalent to the first embodiment.

According to a second alternative of this second embodiment of the device for quantification 12, the protective coating 38 can be replaced with n independent protective coatings $38_1, 38_2, \ldots, 36_i, \ldots 38_{n-1}, 38_n$, for example made of PTFE also, wherein the n independent modules can be respectively arranged. In this case, the interconnection electric circuit 34 of these independent modules, insulated electrically and thermally from one another and from the fluid contained in the tank 12, is itself electrically insulated, for example using sealed connectors.

These two alternative variants are shown in FIG. 3 through a representation as broken lines of the protective coating 38 on the one hand (first alternative), and of the n independent protective coatings $38_1, 38_2, \ldots, 36_i, \ldots 38_{n-1}, 38_n$, on the other hand (second alternative).

The second embodiment shown in FIG. 3 adds modularity to the implementation of the device for quantification 14. More precisely, the device for quantification 14 designed as such can be constituted of a variable number of independent modules, with this number able to be determined on a case-by-case basis according to the size of the tank 12 and the desired precision of the value of quantification of useful heat available. Indeed, the number of thermoelectric converters $e_1, e_2, \ldots, e_i, \ldots, e_{n-1}, e_n$ in the device for quantification 14 influences on the precision of the value of quantification of the useful heat available measured in the tank 12. As such, the more thermoelectric converters there are, the more isothermal strata are evaluated in the tank 12 and the more precise the value for the quantification of the hot water is.

Figure 4:
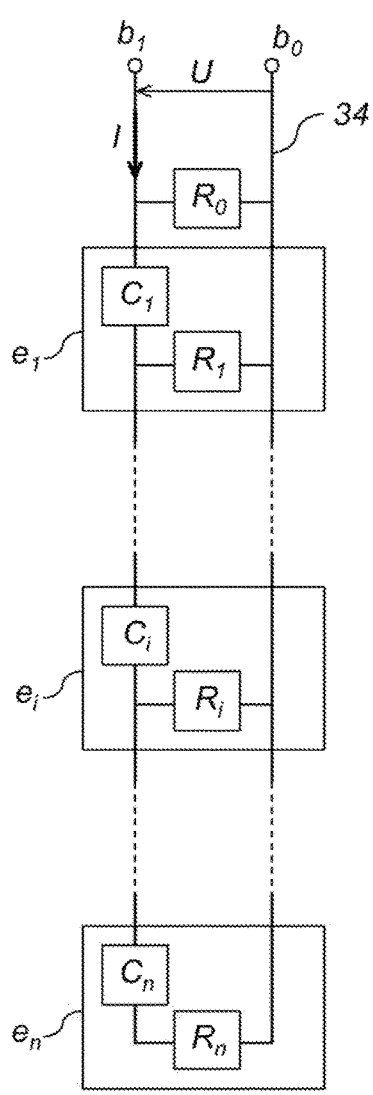

As shown in FIG. 4, according to a first alternative of the electrical structure of the device 14 for quantifying useful heat of FIG. 2 or 3, each one of the n thermoelectric converters $e_1, \ldots, e_i, \ldots, e_n$ includes an electrical temperature sensor and an electrical resistance, in such a way that the electrical structure comprises n electrical temperature sensors $C_1, \ldots, C_i, \ldots, C_n$ and n electrical resistances $R_1, \ldots, R_i, \ldots, R_n$ arranged respectively in the n thermoelectric converters $e_1, \ldots, e_i, \ldots, e_n$ in the following way:

the electrical temperature sensors $C_1, \ldots, C_i, \ldots, C_n$ each have an input terminal and an output terminal and are arranged in series together in the interconnection electrical circuit 34 starting from measuring point $b_1$ with the input terminal of the first sensor $C_1$ being connected to the measuring point $b_1$ and the input terminal of each other sensor $C_2, \ldots, C_i, \ldots, C_n$ being connected to the output terminal of the preceding sensor $C_1, \ldots, C_{i-1}, \ldots, C_{n-1}$, and each electrical resistance $R_1, \ldots, R_i, \ldots, R_n$ connects the output terminal of the electrical temperature sensor $C_1, \ldots, C_i, \ldots, C_n$ of the thermoelectric converter $e_1, \ldots, e_i, \ldots, e_n$ to which it belongs to the measuring point $b_0$.

Moreover, an electrical resistance $R_0$ is connected by its ends to the two measuring points $b_0$ and $b_1$.

As soon as an imposed electric current I is injected into the electric circuit 34 starting from point $b_1$, a single electrical variable in the form of an electrical voltage U can be measured between the measuring points $b_0$ and $b_1$ at the terminals of the device for measuring 24 which is then a voltmeter.

Alternatively, the single electrical variable measured can be an intensity I passing through the device for measuring 24, which is then an ammeter, as soon as an imposed electrical voltage U is applied between the measuring points $b_0$ and $b_1$ at the terminals of the device for measuring 24.

The n electrical temperature sensors $C_1, \ldots, C_i, \ldots, C_n$ are for example thermoelectric switches, in particular thermal breakers of the bi-strip type, thermal breakers of the bimetal type or resettable fuses with a positive temperature coefficient. These types of thermoelectric switches act as electrical switches that are sensitive to opening and closing at a temperature threshold value. In accordance with the invention, this is the predetermined threshold temperature $T_s$ common to all of the thermoelectric converters, for example equal to 40° C. in the case of a system for supplying sanitary hot water. In the example of the first alternative, the thermoelectric switches open when their temperature is less than this threshold temperature $T_s$.

As such, when the temperature of the fluid inside the tank 12 is greater than $T_s$ in the upper portion up to a certain level, identified by the flat limit L, the k thermoelectric switches $C_1, \ldots, C_k$ located above this level L are closed and the k+1 electrical resistances $R_0, R_1, \ldots, R_k$ are connected together in parallel.

By noting as $R_e$ the equivalent electrical resistance of the electric circuit 34 at the terminals $b_0$ and $b_1$ of the device for measuring 24, the following relationship links the aforementioned voltage U and the intensity I:

$$U = I \cdot R_e$$

The value of the equivalent electrical resistance $R_e$ depends on the value of each one of the n+1 electrical resistances and on the open or closed position of each one of the thermoelectric switches according to the distribution of the temperature in the tank 12. It is calculated according to the following equation:

$$\frac{1}{R_e} = \frac{1}{R_0} + \sum_{i=1}^{n} \frac{H(T_i - T_s)}{R_i}$$

where H represents the Heaviside function which indicates the open or closed position of each thermoelectric switch in the electric circuit 34. As such, for any thermoelectric switch $C_i$, the value of H is equal to "0" if the temperature $T_i$ in the vicinity of this thermoelectric switch $C_i$ is less than the threshold temperature $T_s$ (open switch) and it is equal to "1" if the temperature $T_i$ in the vicinity of this thermoelectric switch $C_i$ is greater than the threshold temperature $T_s$ (closed switch).

As indicated hereinabove and in the particular case of the embodiment shown in FIG. 1, the k adjacent thermoelectric switches $C_1, \ldots, C_k$ arranged in the upper portion of the tank 12 above the level L are closed and consequently the k+1 first electrical resistances $R_0, \ldots, R_k$ of the circuit are connected together in parallel thus participating in the calculation of the equivalent resistance $R_e$.

In light of the two preceding equations, if a constant intensity I is imposed, then the value of voltage $U_k$ measured at the terminals of the device for measuring 24 when the k first thermoelectric switches $C_1, \ldots, C_k$ are closed is given by the following equation:

$$\forall k \in [0, n], \frac{I}{U_k} = \sum_{i=0}^{k} \frac{1}{R_i}$$

This equation makes it possible to iteratively calculate the values of the resistances $R_0, R_1, \ldots, R_i, \ldots, R_n$ according to the possible values of voltage $U^k$:

$$\begin{cases} \frac{1}{R_0} = \frac{I}{U_0} \\ \forall k \in [1, n], \frac{1}{R_k} = \frac{I}{U_k} - \sum_{i=0}^{k-1} \frac{1}{R_i} \end{cases}$$

It can then be imposed for example that the possible values for the voltage $U_k$ expressed in Volt be in a decreasing linear relationship with the number k of closed thermoelectric switches according to the equation:

$$U_k = n + 1 - k$$

In this way, there is a decreasing linear relationship between the possible values for the voltage $U_k$ and a value Q for quantifying the useful heat available in the tank 12 expressed as a percentage of the fluid in the tank 12 of which the temperature is greater than or equal to the threshold temperature $T_s$, with this value Q being of discrete values directly correlated to the number k of closed thermoelectric switches:

$$Q(k) = 100 \cdot \frac{k}{n} = \frac{100}{n} \cdot (n + 1 - U_k)$$

Figure 5:
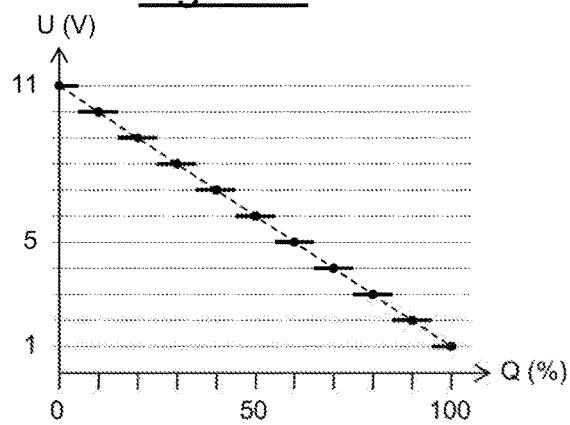
FIG. 5 shows a diagram for the converting of a single electrical variable that can be measured of the alternative of FIG. 4 into a value for the quantification of useful thermal energy available in the system of FIG. 1, and FIGS. 6 to 10 diagrammatically show the detailed electrical structures of other possible alternatives of the device of FIG. 2 or 3.

FIG. 5 shows this relationship of decreasing linearity between the electrical variable U measured by the device for measuring 24 and the value Q for quantifying the useful heat available in the tank 12 defined hereinabove, for n=10. When k=0 for example, none of the thermoelectric switches are closed, the voltage U measured is 11 V and Q is 0%. When k=10, all of the thermoelectric switches are closed, the voltage U measured is 1 V and Q is 100%. More precisely, if each thermoelectric switch is placed in the middle of the isothermal stratum to which it is associated, $U=U_k$ means that Q=Q(k)+/−5% and the decreasing linearity is done in stages. This linearity relationship is implemented in the module for converting 30.

For an imposed intensity I of 20 mA and n=10, this results in that, in order to comply with this linear relationship between U and Q, the resistances $R_0, R_1, \ldots, R_i, \ldots, R_{10}$ have to have the following values:

$$\frac{1}{R_0} = \frac{I}{U_0} = \frac{20.10^{-3}}{11}$$

where $R_0 = 550\Omega$, $$\frac{1}{R_1} = \frac{I}{U_1} - \frac{1}{R_0} = \frac{20.10^{-3}}{10} - \frac{1}{550}$$

where $R_1 = 5500\Omega$, $$\frac{1}{R_2} = \frac{I}{U_2} - \frac{1}{R_0} - \frac{1}{R_1} = \frac{20.10^{-3}}{9} - \frac{1}{550} - \frac{1}{5550}$$

where $R_2 = 4500\Omega$,
etc. (for the calculation of $R_3$ to $R_{10}$).

The table hereinbelow shows the details of all of the numerical values obtained for $U_k$, $R_k$ and Q(k) when I=20 mA and for k, varying from 0 to 10, indicating the number of closed thermoelectric switches starting from the top of the tank 12.

| k | $U_k$ (V) | $R_k$ ($\Omega$) | Q (k) (%) |
|---|---|---|---|
| 0 | 11 | 550 | 0 |
| 1 | 10 | 5500 | 10 |
| 2 | 9 | 4500 | 20 |
| 3 | 8 | 3600 | 30 |
| 4 | 7 | 2800 | 40 |
| 5 | 6 | 2100 | 50 |
| 6 | 5 | 1500 | 60 |
| 7 | 4 | 1000 | 70 |
| 8 | 3 | 600 | 80 |
| 9 | 2 | 300 | 90 |
| 10 | 1 | 100 | 100 |

Alternatively, a constant voltage U can be imposed and one can measure the intensity $I_k$ at the terminals of the device for measuring 24 when the k first thermoelectric switches $C_1, \ldots, C_k$ are closed. This intensity is given by the following equation:

$$\forall k \in [0, n], \quad \frac{I_k}{U} - \sum_{i=0}^{k} \frac{1}{R_i}$$

This equation makes it possible to iteratively calculate the values of the resistances $R_0, R_1, \ldots, R_i, \ldots, R_n$ according to the possible values for the intensity $I_k$:

$$\begin{cases} \frac{1}{R_0} = \frac{I_0}{U} \\ \forall k \in [1, n], \quad \frac{1}{R_k} = \frac{I_k}{U} - \sum_{i=0}^{k-1} \frac{1}{R_i} \end{cases}$$

It can then be imposed for example that the possible values for the intensity $I_k$ expressed in Ampere be in an increasing linear relationship with the number k of closed thermoelectric switches according to the equation:

$$I_k = 0.004 + k \cdot 10^{-3}$$

In this way, there is an increasing linear relationship between the possible values of the intensity $I_k$ and the value Q for quantifying the useful heat available in the tank 12 expressed as a percentage of fluid in the tank 12 of which the temperature is greater than the threshold temperature $T_s$, with this value Q being directly correlated to the number k of closed thermoelectric switches:

$$Q(k) = 100 \cdot \frac{k}{n} = \frac{10^5}{n} \cdot (I_k - 0,004)$$

For n=10, when k=0 for example, none of the thermoelectric switches are closed, the intensity I measured is 4 mA and Q is 0%. When k=10, all of the thermoelectric switches are closed, the intensity I measured is 14 mA and Q is 100%. This linearity relationship is implemented in the module for converting 30.

For an imposed voltage U of 10 V and for n=10, this results in that, in order to comply with this linear relationship between I and Q, the resistances $R_0, R_1, \ldots, R_i, \ldots, R_{10}$ must have the following values:

$$\frac{1}{R_0} = \frac{I_0}{U} = \frac{4.10^{-3}}{10}$$

where $R_0 = 2500\Omega$, $$\frac{1}{R_1} = \frac{I_1}{U} - \frac{1}{R_0} = \frac{5.10^{-3}}{10} - \frac{1}{2550}$$

where $R_1 = 10000\Omega$, $$\frac{1}{R_2} = \frac{I_2}{U} - \frac{1}{R_0} - \frac{1}{R_1} = \frac{6.10^{-3}}{10} - \frac{1}{2500} - \frac{1}{10000}$$

where $R_2 = 10000\Omega$,
etc. (for the calculation of $R_3$ to $R_{10}$).

The table hereinbelow shows the details of all of the numerical values obtained for $I_k$, $R_k$ and $Q(k)$ when U=10 V and for k, varying from 0 to 10, indicating the number of closed thermoelectric switches starting from the top of the tank 12.

| k  | $I_k$ (A) | $R_k$ (Ω) | Q (k) (%) |
|----|-----------|-----------|-----------|
| 0  | 0.004     | 2500      | 0         |
| 1  | 0.005     | 10000     | 10        |
| 2  | 0.006     | 10000     | 20        |
| 3  | 0.007     | 10000     | 30        |
| 4  | 0.008     | 10000     | 40        |
| 5  | 0.009     | 10000     | 50        |
| 6  | 0.010     | 10000     | 60        |
| 7  | 0.011     | 10000     | 70        |
| 8  | 0.012     | 10000     | 80        |
| 9  | 0.013     | 10000     | 90        |
| 10 | 0.014     | 10000     | 100       |

Figure 6:
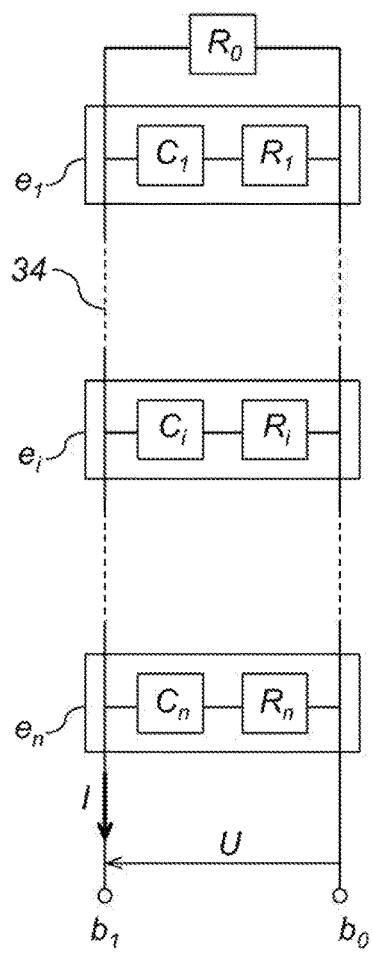

FIG. 6 shows a second alternative of the electrical structure of the device 14 for quantifying useful heat of FIG. 2 or 3.

This second alternative differs from the preceding shown in FIG. 4 in that:
in each thermoelectric converter $e_i$, the electrical temperature sensor constituted of a thermoelectric switch $C_i$, is arranged in series with the electrical resistance $R_i$, and the thermoelectric converters $e_1, \ldots, e_i, \ldots, e_n$ are arranged in parallel between them in the interconnection electrical circuit 34.

Moreover, by way of example and in order to show the various possibilities of the installation of the device for quantification 14, in FIG. 6 the measuring points $b_0$ and $b_1$ are placed at the bottom of the tank 12 whereas in FIG. 4 they are placed at the top. However, the position of these measuring points and therefore of the device for measuring 24 with respect to the tank 12 does not modify the behaviour of the device 14 for quantifying useful heat hi the two cases shown in FIGS. 4 and 6, the user can choose the position of the device for measuring 24 at the top or at the bottom of the tank 12 according to the physical constraints linked to each particular installation. The rest of the calculations, i.e. the establishing of the table of relationships between $U_k$, $R_k$ and $Q(k)$ or between $I_k$, $R_k$ and $Q(k)$ is identical in these two alternatives of FIGS. 4 and 6.

Figure 7:
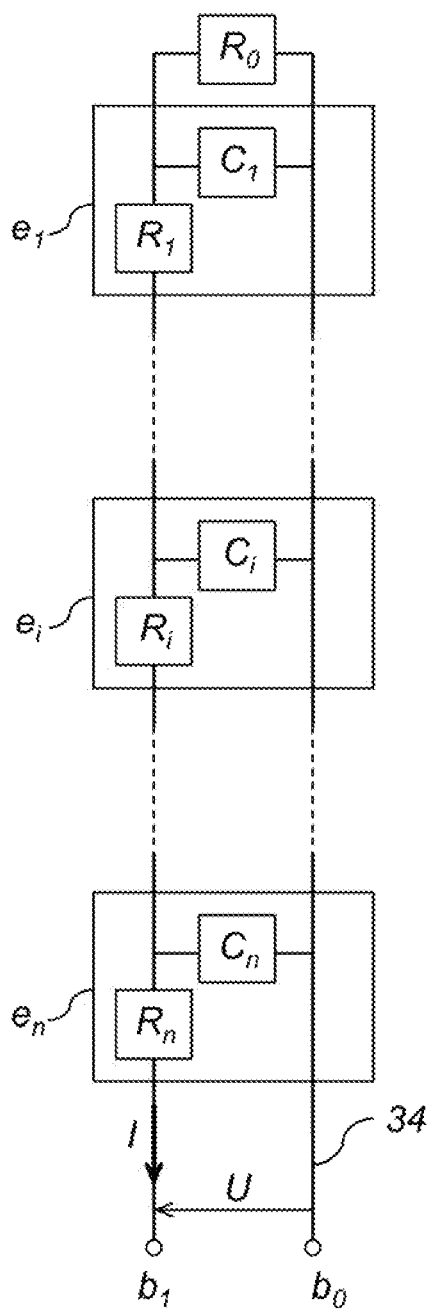

FIG. 7 shows a third alternative of the electrical structure of the device 14 for quantifying useful heat of FIG. 2 or 3.

This third alternative differs from the two preceding ones shown in FIGS. 4 and 6 in that:
the electrical resistances $R_0, R_1, \ldots, R_i, \ldots, R_n$ are arranged in series in the interconnection electrical circuit 34 between the measuring points $b_0$ and $b_1$, and each electrical temperature sensor $C_i$ connects one of the two terminals of the electrical resistance R of the thermoelectric converter $e_i$ to which it belongs to the first measuring point $b_0$: this is more precisely the terminal that connects the resistance $R_i$ to the resistance $R_{i-1}$.

In the example of FIG. 7, the measuring points $b_0$ and $b_1$ are located at the bottom of the tank 12, in such a way that the measuring point $b_0$ is connected to the electrical resistance $R_0$ and that the measuring point $b_1$ is connected to the electrical resistance $R_n$. They could also be placed at the top of the tank 12 but it would then be suitable to adapt the electrical structure so that the resistances remain arranged in series between these two measuring points.

As in the two preceding alternatives, as soon as an imposed electrical current I is injected into the electric circuit 34 starting from point $b_0$, a single electrical variable in the form of an electrical voltage U can be measured between the measuring points $b_0$ and $b_1$ at the terminals of the device for measuring 24.

Alternatively, the single electrical variable measured can be an intensity I passing through the device for measuring 24 as soon as an imposed electrical voltage U is applied between the measuring points $b_0$ and $b_1$ at the terminals of the device for measuring 24.

As in the two preceding alternatives also, the n electrical temperature sensors $C_1, \ldots, C_i, \ldots, C_0$, are thermoelectric switches of which the behaviour is identical.

As such, when the temperature of the fluid inside the tank 12 is greater than $T_s$ in the upper portion up to a certain level L, the k thermoelectric switches $C_1, \ldots, C_k$ located above this level L are closed and the k electrical resistances $R_0, R_1, \ldots, R_{k-1}$ are short-circuited, in such a way that it can be considered that the current I circulating in the electric circuit 34 passes through only the resistances $R_k, \ldots, R_n$. With full rigour and in practice, the k electrical resistances $R_0, R_1, \ldots, R_{k-1}$ are not entirely short-circuited and even so there is a residual current that circulates but of a very low value in relation to the rest of the circuit, in such a way that it can be neglected.

The voltage U and the intensity I are still linked by the equivalent electrical resistance $R_e$ of the electric circuit 34 according to the following equation:

$$U = I \cdot R_e$$

But in this third alternative, $R_e$ is calculated according to the following equation:

$$R_e \approx \widetilde{R_e} = R_n + \sum_{i=1}^{n} R_{i-1} * H(T_s - T_i)$$

where, as previously described, H represents the Heaviside function which indicates the open or closed position of each thermoelectric switch in the electric circuit 34. According to the expression hereinabove, for any thermoelectric switch $C_i$, the value of H is equal to "1" if the temperature of the water $T_i$ in the vicinity of this thermoelectric switch $C_i$ is less than the threshold temperature $T_s$ (open switch) and it is equal to "0" if the temperature of the water $T_i$ in the vicinity of this thermoelectric switch $C_i$ is greater than the threshold temperature $T_s$ (closed switch).

As indicated hereinabove and in the particular case of the embodiment shown in FIG. 1, the k adjacent thermoelectric switches $C_1, \ldots, C_k$ arranged in the upper portion of the tank above the level L are closed and consequently the n−k+1 last electrical resistances $R_k, \ldots, R_n$ of the circuit are connected together in series thus participating in the calculation of the equivalent resistance $R_e$.

In light of the two preceding equations, if a constant intensity I is imposed, then the value of voltage $U_k$ measured at the terminals of the device for measuring 24 when the k first thermoelectric switches $C_1, \ldots, C_k$ are closed is given by the following equation:

$$\forall k \in [0, n], \quad U_k = I \cdot \left( \sum_{i=k}^{n} R_i \right)$$

This equation makes it possible to iteratively calculate the values of the resistances $R_n, \ldots, R_i, \ldots, R_1, R_0$ according to the possible values of voltage $U_k$:

$$\begin{cases} R_n = \dfrac{U_n}{I} \\ \forall k \in [0, n-1], \; R_k = \dfrac{U_k}{I} - \sum_{i=k+1}^{n} R_i \end{cases}$$

It can be imposed for example as hereinabove that the possible values for the voltage $U_k$ expressed in Volt be in a decreasing linear relationship with the number k of closed thermoelectric switches according to the equation:

$$U_k = n+1-k$$

In this way, the decreasing linear relationship between the possible values for the voltage $U_k$ and the value Q such as shown in FIG. 6 is respected.

For an imposed intensity I of 20 mA and for n=10, this results in that, in order to comply with this linear relationship between U and Q, the resistances $R_0, R_1, \ldots, R_i, \ldots, R_{10}$ have to have the following values:

$$R_{10} = \frac{U_{10}}{I} = \frac{1}{10.10^{-3}}$$

where $R_{10} = 100\,\Omega$, $$R_9 = \frac{U_9}{I} - R_{10} = \frac{2}{10.10^{-3}} - 100$$

where $R_9 = 100\,\Omega$, $$R_8 = \frac{U_8}{I} - R_9 - R_{10} = \frac{3}{10.10^{-3}} - 200$$

where $R_8 = 100\,\Omega$,
etc. (for the calculation of $R_7$ to $R_0$).

The table hereinbelow shows the details of all of the numerical values obtained for $U_k$, $R_k$ and Q(k) when I=20 mA and for k, varying from 0 to 10, indicating the number of closed thermoelectric switches starting from the top of the tank 12.

Advantageously, in this third alternative the electrical resistances all have the same value, as such making it possible to prevent assembly errors during the manufacture of the device.

| k | $U_k$ (V) | $R_k$ ($\Omega$) | Q (k) (%) |
|---|---|---|---|
| 0 | 11 | 100 | 0 |
| 1 | 10 | 100 | 10 |
| 2 | 9 | 100 | 20 |
| 3 | 8 | 100 | 30 |
| 4 | 7 | 100 | 40 |
| 5 | 6 | 100 | 50 |
| 6 | 5 | 100 | 60 |
| 7 | 4 | 100 | 70 |
| 8 | 3 | 100 | 80 |
| 9 | 2 | 100 | 90 |
| 10 | 1 | 100 | 100 |

Figure 8:
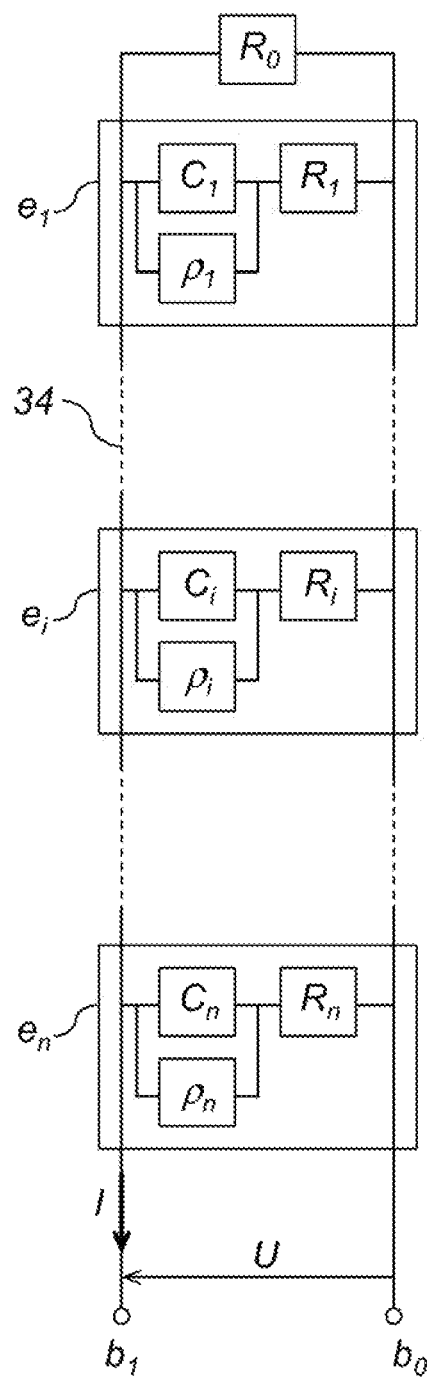

FIG. 8 shows a fourth alternative of the electrical structure of the device 14 for quantifying useful heat of FIG. 2 or 3.

This fourth alternative differs from the second alternative shown in FIG. 6 only in that a thermistor $\rho_i$ is arranged in parallel at the terminals of each thermoelectric switch $C_i$ of each thermoelectric converter $e_i$ in order to constitute the electrical temperature sensor.

The value of the electrical resistance of each thermistor $\rho_i$ varies regularly according to the temperature in the vicinity of the thermoelectric converter $e_i$ to which it belongs, being added to that of the resistance $R_i$ when the thermoelectric switch $C_i$ is open. As such, in this alternative, the thermoelectric switches $C_1, \ldots, C_n$ are advantageously switches that open when the temperature is greater than $T_s$ and which otherwise remain closed. The value of the single electrical variable measured U or I at the terminals of the device for measuring 24 is then not only depending on the number k of open thermoelectric switches above the level L, but furthermore variable according to the various values of the electrical resistances of the thermistors located above the level L and therefore of the various temperatures of isothermal strata located above the level L.

Starting with these variations in the value of the single electrical variable U or I measured, a post-processing of the signal makes it possible to more finely determine the variations in temperature above the level L, i.e. in the useful portion of the tank 12, and as such to obtain a quantity of useful energy that is actually available above the threshold temperature $T_s$. It is then possible to determine with more precision the value for quantifying the useful heat available in the tank 12.

The operation of this fourth alternative is similar to that of the second alternative. The only difference resides in the expression of the equivalent electrical resistance $R_e$. The latter, in addition to being a function of the value of each one of the n+1 electrical resistances $R_0, R_1, \ldots, R_i, \ldots, R_n$ and of the open or closed position of the thermoelectric switches $C_1, \ldots, C_i, \ldots, C_n$, depends on the value of the resistance of each one of the n thermistors $\rho_1, \ldots, \rho_i, \ldots, \rho_n$ according to the distribution of the temperature in the useful part of the tank 12. It is calculated according to the following equation:

$$\frac{1}{R_e} = \frac{1}{R_0} + \sum_{i=1}^{n} \frac{1}{R_i + \rho_i(T_i) * H(T_i - T_s)}$$

where $\rho_i(T_i)$ is the value of the resistance of the thermistor $\rho_i$ at the temperature $T_i$.

This alternative is particularly useful in the systems for supplying hot water based on a renewable energy source, with the temperature in the tank 12 able to rise in this case largely above the threshold temperature $T_s$, for example up to 60° C. when the threshold temperature is defined at 40° C. Using thermistors makes it possible to have an indication of the different temperatures in the portion of the tank 12 where the temperature is greater than 40° C. and to quantify with greater precision the useful heat actually available in the tank 12 with respect to this threshold of 40° C. It is as such possible, either to quantify more precisely the useful heat exceeding the threshold of 40° C. in the tank 12, or to quantify the useful heat actually available at the exact temperature of the threshold of 40° C. knowing that any water available at a temperature greater than the threshold in the tank 12 can be mixed with cold water coming from another source in order to provide water at 40° C.

Note that the improvement added by the fourth alternative to the second alternative by adding the thermistors $\rho_1, \ldots, \rho_i, \ldots, \rho_n$ to the respective terminals of the thermoelectric switches $C_1, \ldots, C_i, \ldots, C_n$ can be easily applied in the same way to the first and third alternatives.

Figure 9:
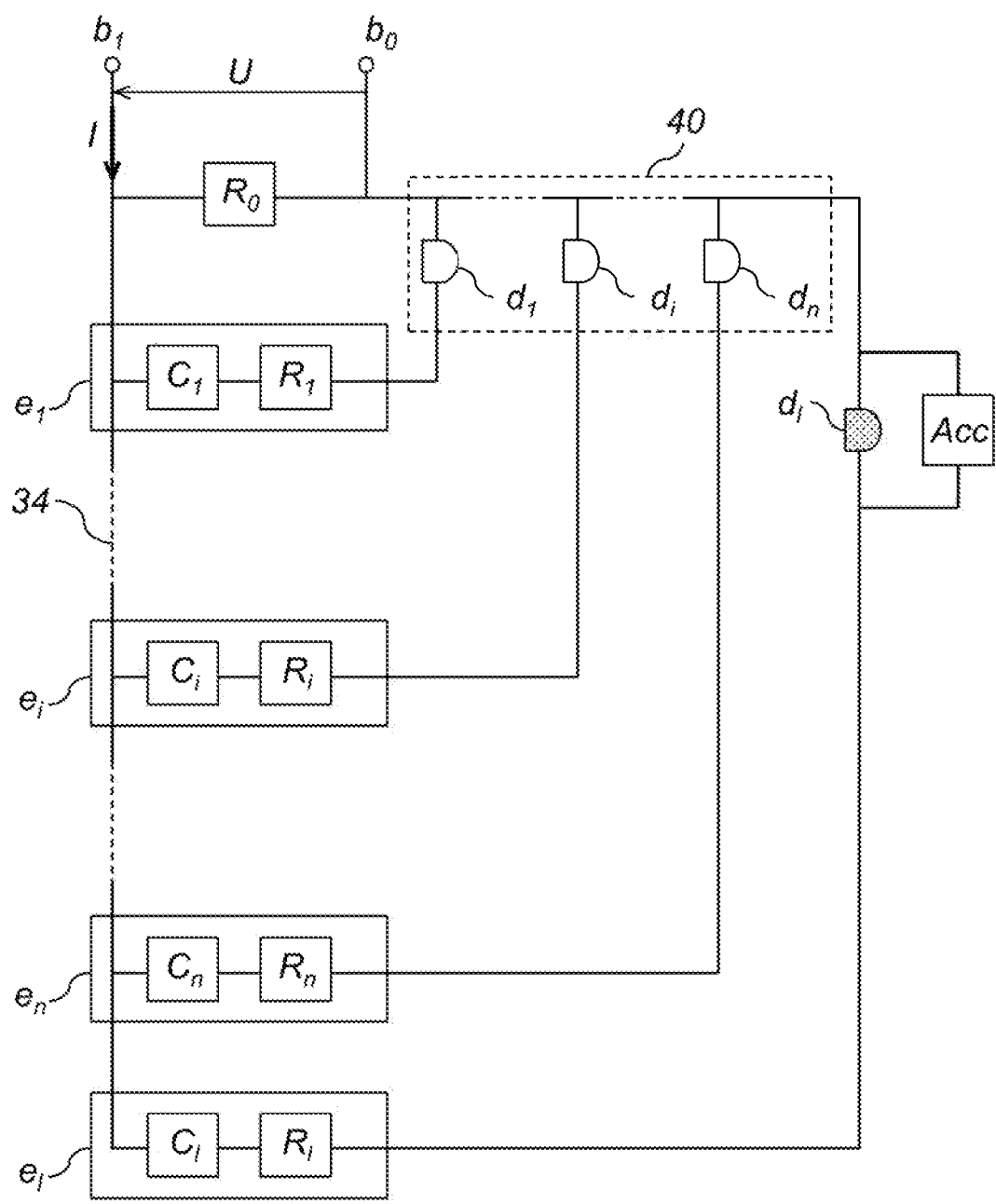

FIG. 9 shows a fifth alternative of the electrical structure of the device 14 for quantifying useful heat of FIG. 2 or 3.

This fifth alternative adds two new improvements to the second alternative shown in FIG. 6.

The first of these two new improvements consists in placing a light-emitting diode $d_i$ in series between each thermoelectric converter $e_i$ and the measuring point $b_0$. The n diodes $d_1, \ldots, d_i, \ldots, d_n$ placed as such, for example arranged in the upper portion of the tank 12 and in a way that can be seen from the outside, constitute an additional lighted display 40 which makes it possible to provide a first direct visual estimate of the value for the quantification of the useful heat available in the tank 12 without needing to convert the single electrical variable U or I measured and upstream of this measurement. Each light-emitting diode $d_i$ is activated according to the temperature in the vicinity of the corresponding thermoelectric switch $C_i$: more precisely, as soon as the temperature of the thermoelectric switch $C_i$ exceeds the predetermined threshold temperature $T_s$, it closes and the light-emitting diode $d_i$ turns on.

Note that this first new improvement added by the fifth alternative to the second alternative can easily be applied in the same way to the first and third alternatives, after a few adaptations within the scope of those skilled in the art.

The second of the two new improvements provided by the fifth alternative consists in adding an additional thermoelectric converter $e_i$ in the lower portion of the tank 12, with this additional thermoelectric converter $e_i$ being, for reasons of sanitary safety, sensitive to a temperature setting $T_i$ that corresponds to the triggering of a process of bactericidal treatment, for example a treatment process for the bacteria "*Legionella Pneumophila*". According to this process, all of the water for sanitary use contained in the tank 12 must be brought on a regular basis for a relatively short period to a temperature that is greater than the temperature setting $T_i$, for example every 24 to 48 hours and for a temperature setting $T_i$ between 55 and 65° C. with regards to *Legionella Pneumophila*.

The additional thermoelectric converter $e_i$ is therefore constituted of an electrical temperature sensor $C_i$, more precisely a thermoelectric switch that closes when the temperature setting $T_i$ is reached in the lower portion of the tank 12, arranged in series with a resistance $R_i$. It is associated in series with an additional diode $d_i$ and advantageously arranged with it in the electric circuit 34 in parallel with the other thermoelectric converters $e_1, \ldots, e_i, \ldots, e_n$ associated with their own diodes $d_1, \ldots, d_i, \ldots, d_n$. Any energy accumulator Acc (system with capacitor (s), battery or other) is moreover arranged at the terminals of the additional diode $d_i$, for an autonomous supply of this diode $d_i$ for at least all of the duration between two required treatments for *Legionella Pneumophila*.

As such, when all of the water contained in the tank 12 is brought beyond the temperature setting $T_i$, the thermoelectric switch $C_i$ located in the bottom portion of the tank 12 is closed and the diode $d_i$ is activated, the accumulator Acc being charged with electrical energy. When after this bactericidal treatment of short duration, the water in the bottom portion of the tank 12 passes under the temperature setting $T_i$, the thermoelectric switch $C_i$ opens, but the diode $d_i$ remains activated thanks to the energy accumulator Acc during at least the scheduled duration between two treatments. At the following treatment, if all unfolds in accordance with the process, the diode dl is then still lit when all of the water contained in the tank 12 is again brought beyond the temperature setting $T_i$ and when the thermoelectric switch $C_i$ again closes. It can therefore be observed that the water contained in the tank 12 is correctly treated for *Legionella Pneumophila* as long as the diode $d_i$ remains lit.

It should be noted moreover that the integration of the additional thermoelectric converter $e_i$, of the additional diode $d_i$ and of the energy accumulator Acc in the electric circuit 34 of the device 14 for quantifying useful heat does not disturb its operation detailed hereinabove. Furthermore, the energy accumulator Ace could be replaced with a timer associated with an autonomous power supply of electrical energy in order to carry out the same function of maintaining in activation the additional diode $d_i$.

Also note that this second new improvement added by the fifth alternative to the second alternative can be easily applied in the same way to the first and third alternatives.

Finally, note that this fifth alternative is further distinguished from the second in that the measuring points $b_0$ and $b_1$ are placed in the upper portion and not in the bottom portion of the tank 12, which does not change anything in its operating principle.

Figure 10:
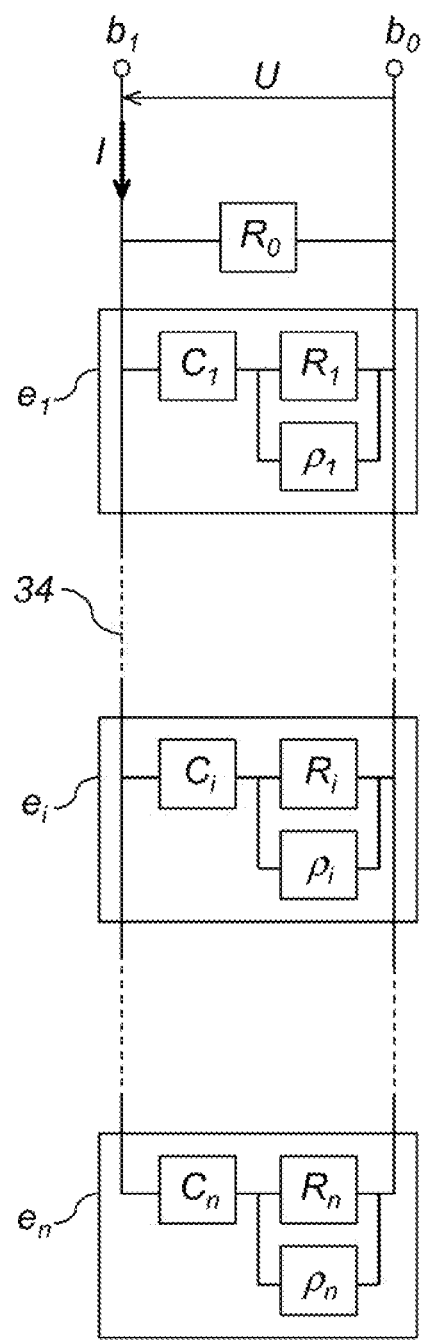

FIG. 10 shows a sixth alternative of the electrical structure of the device 14 for quantifying useful heat of FIG. 2 or 3.

This sixth alternative differs from the second alternative shown in FIG. 6 in that a thermistor $\rho_i$ is arranged in parallel at the terminals of each resistance $R_i$ of each thermoelectric converter $e_i$.

As for the fourth alternative, the value of the electrical resistance of each thermistor $\rho_i$ varies regularly according to the temperature in the vicinity of the thermoelectric converter $e_i$ to which it belongs. On the other hand, differently to the fourth alternative, it is the inverse of the value of the electrical resistance of each thermistor $p_i$ that is added to the inverse of that of the resistance $R_i$ when the thermoelectric switch $C_i$ is closed.

In this sixth alternative, if the thermoelectric switches $C_1, \ldots, C_n$ are switches that close when the temperature is greater than $T_s$ and which otherwise remain open, the value of the single electrical variable measured U or I at the terminals of the device for measuring 24 is not only dependent on the number k of closed thermoelectric switches above the level L, but furthermore variable according to the various values of the electrical resistances of the thermistors located above the level L and therefore of the various temperatures of isothermal strata located above the level L. Starting from these variations in the value of the single electrical variable U or I measured, a post-processing of the signal makes it possible to even more finely determine than in the fourth alternative the variations in temperature above the level L, i.e. in the useful portion of the tank 12, and as such to obtain a useful quantity of energy that is actually available above the threshold temperature $T_s$. It is then possible to determine with even further precision the value of quantification of the useful heat available in the tank 12. This is particularly interesting in applications where the contents of the tank 12 is heated using uncontrolled renewable sources of energy (i.e. solar energy systems for example).

In this sixth alternative also, if the thermoelectric switches $C_1, \ldots, C_n$ are switches that open when the temperature is greater than $T_s$ and which otherwise remain closed, the value of the single electrical variable measured U or I at the terminals of the device for measuring 24 is not only dependent on the number k of closed thermoelectric switches below the level L, but furthermore variable according to the different values of the electrical resistances of the thermistors located below the level L and therefore of the various temperatures of isothermal strata located below the level L. Starting from these variations of the value of the single electrical variable U or I measured, a post-processing of the signal makes it possible to determine very finely the variations in temperature below the level L, i.e. in the portion to be heated of the tank 12, and as such to obtain a useful quantity of energy above the threshold temperature $T_s$ that is actually lacking. It is as such possible to determine with great precision the value for quantifying the useful heat lacking in the tank 12. This is particularly interesting in applications where the content of the tank 12 is heated using controlled sources (i.e. heat pump, gas or electricity systems).

The operation of this sixth alternative is similar to that of the second alternative. The only significant difference resides in the expression of the equivalent electrical resistance $R_e$. The latter, in addition to being a function of the value of each one of the n+1 electrical resistances $R_0$, $R_1, \ldots, R_i, \ldots, R_n$ and of the open or closed position of the thermoelectric switches $C_1, \ldots, C_i, \ldots, C_n$, depends on the value of the resistance of each one of the n thermistors $\rho_1, \ldots, \rho_i, \ldots, \rho_n$ according to the distribution of the temperature in the tank 12. For example, in the case where the thermoelectric switches are closed when the temperature is greater than $T_s$ and are otherwise open, it is calculated according to the following equation:

$$\frac{1}{R_e} = \frac{1}{R_0} + \sum_{i=1}^{n}\left(\frac{1}{R_i} + \frac{1}{\rho_i}\right)H(T_i - T_s)$$

where $\rho_i(T_i)$ is the value of the resistance of the thermistor $\rho_i$ at the temperature $T_i$.

In accordance with this alternative, it is suitable to correctly choose the values of the resistances $R_0, R_1, \ldots, R_i, \ldots, R_n$ in order to establish a bijective relationship, but not necessary linear, between the value of the equivalent electrical resistance $R_e$ and the quantity of useful heat available or lacking in the tank 12. This choice is within the scope of those skilled in the art and is to be determined according to each particular application.

Note that the improvement added by the sixth alternative to the second alternative by adding the thermistors $\rho_1, \ldots, \rho_i, \ldots, \rho_n$ to the respective terminals of the resistances $R_1, \ldots, R_i, \ldots, R_n$ can be easily applied in the same way to the first, third and fifth alternatives.

Of course, many other alternatives can be considered for the electrical structure of the device 14 for quantifying useful heat.

It clearly appears that a device for the quantification of useful heat such as any one of those described hereinabove according to several alternatives makes it possible to obtain, simply and effectively as a single electrical measurement, a relevant value for the quantification of the useful heat available in the storage tank 12 shown in FIG. 1.

Such a type of tank 12 for storing hot water is in particular used in systems for generating, storing and consuming sanitary hot water or water for heating. However, the invention can also be used in other types of systems for generating and storing heat wherein the storage tank 12 can contain a heated fluid other than water or even a heated solid.

Note moreover that the invention is not limited to the embodiments described hereinabove.

In particular, all of the examples described hereinabove concern applications wherein the tank 12 has a simple and one-dimensional stratification (in particular vertical) of the levels of energy, in such a way that the device 14 for quantifying useful heat has an extended portion 22 adapted to this stratification. But for other applications wherein the tank could have a more complex and in particular for example two-dimensional stratification, it is suitable to adapt the configuration of the device 14 and in particular its portion 22. This adaptation is simple and within the scope of those skilled in the art.

Moreover, all of the examples described hereinabove concern applications for supplying useful heat, although more generally, the invention is adapted to any system for supplying useful hot or cold thermal energy. In particular, the tank 12 can also be used in a system for generating, storing and restoring cold. In this case, the useful thermal energy concerns the lower portion of the tank with a threshold temperature adapted to the application in question.

It shall appear more generally to those skilled in the art that various modifications can be made to the embodiments described hereinabove, in light of the information that has just been disclosed of it. In the following claims, the terms used must not be interpreted as limiting the claims to the embodiments disclosed in this description, but must be interpreted in order to include therein all of the equivalents that the claims aim to cover sue to their formulation and of which a forward view is within the scope of those skilled in the art by applying their general knowledge to the implementation that has just been disclosed of it.

The invention claimed is:

1. A device for quantifying a useful thermal energy available in a tank for storing a heated or cooled fluid or solid, the device comprising:
   plural thermally sensitive electric converters configured to be distributed in plural locations of the storage tank;
   an electric circuit interconnecting the thermally sensitive electric converters;
   a device measuring a single electrical variable of the electric circuit;
   means for converting a single measurement of the single electrical variable into a value for quantification of the useful thermal energy available in the storage tank in which the thermally sensitive electric converters are configured to be distributed,
   wherein each thermally sensitive electric converter includes an electrical temperature sensor and at least one electrical resistance, and
   wherein the electrical temperature sensors and the electrical resistances are arranged in the thermally sensitive electric converters such that:
      the electrical temperature sensors are arranged in series together in the interconnection electrical circuit; and
      each electrical resistance connects an output terminal of the electrical temperature sensor of the thermally sensitive electric converter to which it belongs to a first terminal, common to all of the electrical resistances, of the device for measuring.

2. The device for quantifying useful thermal energy according to claim 1, wherein the electrical temperature sensor of each thermally sensitive electric converter includes a thermoelectric switch sensitive in opening and closing to a predetermined temperature threshold value, with the temperature threshold value being common to all of the thermoelectric converters.

3. The device for quantifying useful thermal energy according to claim 2, wherein the thermoelectric switch of each thermally sensitive electric converter is a bi-strip thermal breaker, a bimetal thermal breaker, or a resettable fuse with a positive temperature coefficient.

4. The device for quantifying useful thermal energy according to claim 2, wherein each thermally sensitive electric converter further includes a thermistor arranged in parallel with the thermoelectric switch, at terminals thereof, or arranged in parallel with the electrical resistance, at terminals thereof.

5. The device for quantifying useful thermal energy according to claim 1, wherein the at least one electrical resistance of each thermally sensitive electric converter has a predetermined resistance value to generate a value of the single electrical variable measured which is in a linear relationship with the value for the quantification of the useful thermal energy available in the storage tank.

6. The device for quantifying useful thermal energy according to claim 1, wherein the single electrical variable measured is an intensity passing through the device for measuring or a voltage at terminals of the device for measuring.

7. A system for quantifying useful heat, comprising:
a tank for storing a heated or cooled fluid or solid; and
a device for quantifying useful thermal energy according to claim 1, further comprising means for thermal and electrical insulation.

8. The system for quantifying useful thermal energy according to claim 7, wherein the device for quantifying useful thermal energy is placed in or against the storage tank substantially perpendicular to a plurality of isotherm strata when the storage tank contains a heated or cooled fluid or solid.

9. The system for quantifying useful thermal energy according to claim 8, further comprising a device for indicating the quantification value of the useful thermal energy available in the storage tank, with the indicating device being connected by data transmission means to the device for measuring and placed outside the storage tank to facilitate access of a user to the quantification value.

10. A device for quantifying useful thermal energy available in a tank for storing a heated or cooled fluid or solid, the device comprising:
plural thermally sensitive electric converters configured to be distributed in plural locations of the storage tank;
an electric circuit interconnecting the thermally sensitive electric converters;
a device measuring a single electrical variable of the electric circuit;
means for converting a single measurement of the single electrical variable into a value for quantification of the useful thermal energy available in the storage tank in which the thermally sensitive electric converters are configured to be distributed,
wherein each thermally sensitive electric converter includes an electrical temperature sensor and at least one electrical resistance, and
wherein the electrical temperature sensors and the electrical resistances are arranged in the thermally sensitive electric converters such that:
the electrical resistances are arranged in series together in the interconnection electrical circuit; and
each electrical temperature sensor connects a terminal of the electrical resistance of the thermally sensitive electric converter to which it belongs to a first terminal, common to all of the electrical temperature sensors, of the device for measuring.

11. The device for quantifying useful thermal energy according to claim 10, wherein the electrical temperature sensor of each thermally sensitive electric converter includes a thermoelectric switch sensitive in opening and closing to a predetermined temperature threshold value, with the temperature threshold value being common to all of the thermoelectric converters.

12. The device for quantifying useful thermal energy according to claim 11, wherein the thermoelectric switch of each thermally sensitive electric converter is a bi-strip thermal breaker, a bimetal thermal breaker, or a resettable fuse with a positive temperature coefficient.

13. The device for quantifying useful thermal energy according to claim 11, wherein each thermally sensitive electric converter further includes a thermistor arranged in parallel with the thermoelectric switch, at terminals thereof, or arranged in parallel with the electrical resistance, at terminals thereof.

14. The device for quantifying useful thermal energy according to claim 10, wherein the at least one electrical resistance of each thermally sensitive electric converter has a predetermined resistance value to generate a value of the single electrical variable measured which is in a linear relationship with the value for the quantification of the useful thermal energy available in the storage tank.

15. The device for quantifying useful thermal energy according to claim 10, wherein the single electrical variable measured is an intensity passing through the device for measuring or a voltage at terminals of the device for measuring.

16. A system for quantifying useful heat, comprising:
a tank for storing a heated or cooled fluid or solid; and
a device for quantifying useful thermal energy according to claim 10, further comprising means for thermal and electrical insulation.

17. The system for quantifying useful thermal energy according to claim 16, wherein the device for quantifying useful thermal energy is placed in or against the storage tank substantially perpendicular to a plurality of isotherm strata when the storage tank contains a heated or cooled fluid or solid.

18. The system for quantifying useful thermal energy according to claim 17, further comprising a device for indicating the quantification value of the useful thermal energy available in the storage tank, with the indicating device being connected by data transmission means to the device for measuring and placed outside the storage tank to facilitate access of a user to the quantification value.

* * * * *